No. 877,299. PATENTED JAN. 21, 1908.
M. T. CURRAN.
GRASS CATCHER FOR LAWN MOWERS.
APPLICATION FILED JULY 26, 1907.
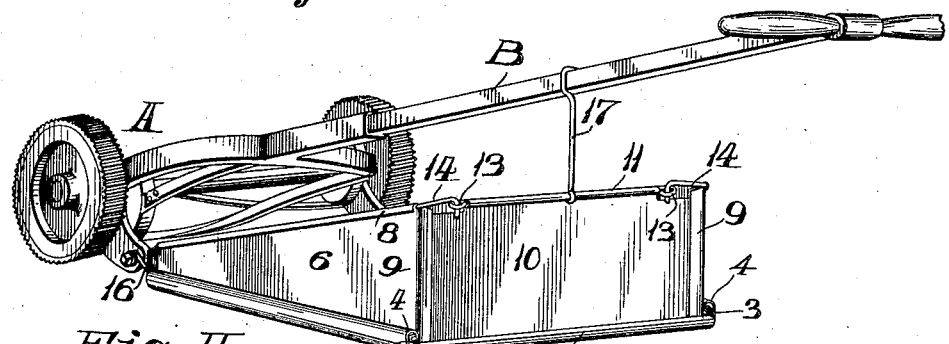
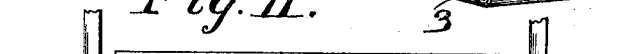
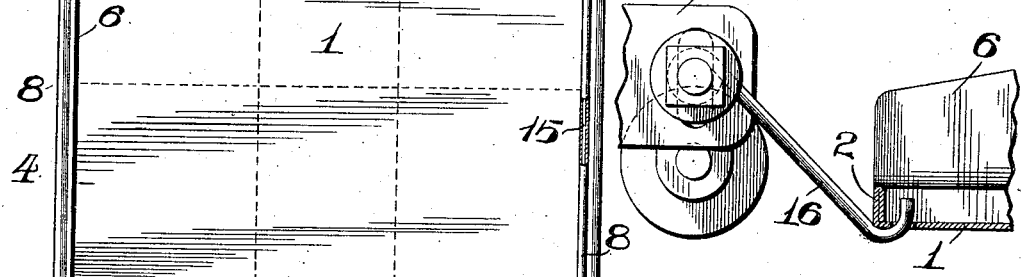
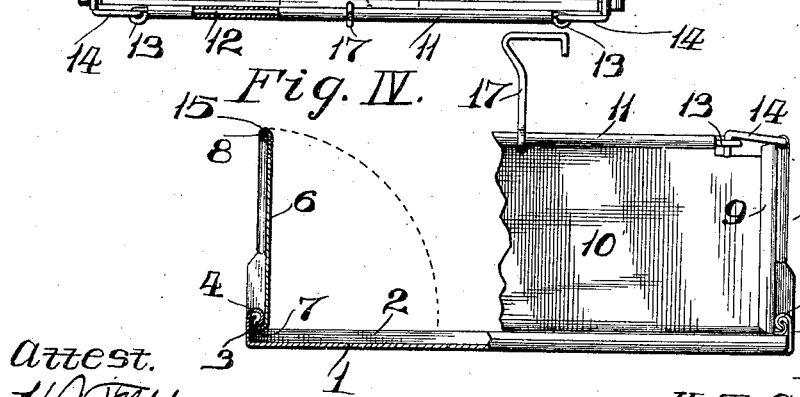
Attest.
H. J. Fletcher
Lily Rost
Inventor.
M. T. Curran.
By Geo. H. Knight
Att'y

UNITED STATES PATENT OFFICE.

MICHAEL T. CURRAN, OF ST. LOUIS, MISSOURI.

GRASS-CATCHER FOR LAWN-MOWERS.

No. 877,299.

Specification of Letters Patent.

Patented Jan. 21, 1908.

Application filed July 26, 1907. Serial No. 385,605.

*To all whom it may concern:*

Be it known that I, MICHAEL T. CURRAN, a citizen of the United States of America, residing in the city of St. Louis and State of Missouri, have invented certain new and useful Improvements in Grass - Catchers for Lawn-Mowers, of which the following is a full, clear, and exact description, reference being had to the accompanying drawing, forming part of this specification.

My invention relates to a grass catcher for attachment to lawn mowers to receive grass as it is cut by the mower, and the invention has for its object the production of an article of this description made of metal and which is therefore much less destructible in usage than the ordinary grass catchers made of cloth or made of cloth and having a metallic bottom.

Figure I is a perspective view of my grass catcher shown applied to a lawn mower. Fig. II is a top or plan view of the grass catcher. Fig. III is an elevation illustrating the means of attachment between the grass catcher and a lawn mower. Fig. IV is a view partly in rear elevation and partly in vertical cross section of the grass catcher.

In the accompanying drawings, A designates a lawn mower provided with the usual handle bar B.

1 designates the metallic bottom of my grass catcher, which is provided at its front end with an upturned flange 2 that is preferably, for the purpose of affording strength therein, folded as clearly shown in Fig. III. The bottom 1 is also provided with upturned side flanges 3 which are bent inwardly to form curled hinge members 4, as seen in Figs. I and IV. The bottom 1 is also provided at its rear end with an inwardly curled hinge member 5.

6 designates the metal side walls of the grass catcher which are provided at their lower edges with curled hinge members 7 that are loosely fitted to the hinge members 4 of the side flanges of the bottom 1 in order that said side walls may be moved into upright positions above the bottom 1 or folded inwardly from upright positions to lie horizontally over said bottom. The upper edge of each side wall is coiled to produce a hollow bead 8.

9 are inturned flanges at the rear ends of the side walls.

10 designates the metal rear wall of the grass catcher which is provided at its lower edge with a curled hinge member that engages the hinge member 5 at the rear end of the bottom 1, for the purpose of securing the rear wall to said bottom in a manner to permit of the wall being moved to a vertical position and folded inwardly and downwardly onto the bottom 1. At the upper edge of the rear wall is a hollow bead 11.

12 is a stiffener rod located in the bead 11 and provided at its ends which project beyond said bead, with eyes 13.

14 are catch arms that are adapted to engage the eyes of the stiffener rod 12 when the side and rear walls 6 and 10 are in upright positions in order that these walls may be securely held in such position, during the use of the grass catcher in connection with a lawn mower. The catch arms 14 are carried by rods 15 that are loosely mounted in the beads 8 of the side walls 6 and which serve as stiffener members for the side walls in addition to their service as pivot members for the catch arms.

It will be seen that the side and rear walls of the grass catcher are efficiently sustained in upright positions when the catcher is to be utilized, due to the rear wall occupying a position between the side walls to prevent inward movement of the side walls and being prevented from rearward movement by the flanges 9 of said side walls, while the walls are connected by the catch arms that engage the eyes 13 of the rear wall. When the catch arms are disengaged from the rear wall, the rear wall may be first folded inwardly and downwardly onto the bottom 1, after which the side walls are folded inwardly and downwardly over the rear wall with the result of so locating the parts that they will occupy a small amount of space when the grass catcher is not in use.

For the purpose of providing for the grass catcher being applied to lawn mowers of different sizes, I produce in the bottom 1 of the catcher two series of perforations 1ª adapted to receive connection hook arms 16, that may be suitably secured to a lawn mower and receive the engagement of the bottom of the catcher in a manner to permit ready attachment and disconnection of the catcher therefrom.

17 is a hanger hook secured to the rear wall of the grass catcher and adapted to be placed in engagement with the handle bar of a lawn mower to support the catcher at its rear end, while it is in service.

I claim:

1. A metallic grass catcher comprising a bottom, side walls hinged to said bottom, a rear wall hinged to said bottom, a stiffener wire mounted in said rear wall and provided with eyes, and catch arms pivotally mounted in said side walls and adapted to engage said eyes when the walls are in upright positions, substantially as described.

2. A metallic grass catcher comprising a bottom, side walls hinged to said bottom and provided at their upper edges with beads, a rear wall hinged to said bottom and provided at its upper edge with a bead, a stiffener wire in the bead of said rear wall terminating at its ends in eyes, and stiffener wires loosely mounted in the beads of said side walls and provided with hook arms adapted to engage the eyes of the stiffener wire in the rear wall when the walls are in upright positions, substantially as described.

3. A metallic grass catcher comprising a bottom having upturned side and rear flanges provided with curled hinge members, and inwardly folding side and rear walls provided with curled hinge members engaging the hinge members of said bottom, substantially as described.

4. A metallic grass catcher comprising a bottom, an inwardly folding rear wall hinged to said bottom, inwardly folding side walls hinged to said bottom and provided at their rear ends with inturned flanges adapted to receive said rear wall when the walls are in upright positions, and means for connecting the said walls when they are in upright positions, substantially as described.

MICHAEL T. CURRAN.

In presence of—
 LILY ROST,
 WM. A. SCOTT.